United States Patent
Hirasawa et al.

(10) Patent No.: US 10,640,949 B2
(45) Date of Patent: May 5, 2020

(54) CONSTRUCTION MACHINE (71) Applicant: Hitachi Construction Machinery Co., Ltd., Taito-ku, Tokyo (JP)

(72) Inventors: Shigeru Hirasawa, Ibaraki (JP); Takeshi Hibiya, Chiba (JP); Toshikazu Kanno, Ibaraki (JP); Kazuhiko Mizoguchi, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 158 days.

(21) Appl. No.: 15/752,747

(22) PCT Filed: Mar. 10, 2016

(86) PCT No.: PCT/JP2016/057682
§ 371 (c)(1),
(2) Date: Feb. 14, 2018

(87) PCT Pub. No.: WO2017/154188
PCT Pub. Date: Sep. 14, 2017

(65) Prior Publication Data
US 2018/0238020 A1    Aug. 23, 2018

(51) Int. Cl.
*E02F 9/08*    (2006.01)
*B60K 15/063*    (2006.01)
(Continued)

(52) U.S. Cl.
CPC ............ *E02F 9/0866* (2013.01); *B60K 11/04* (2013.01); *B60K 11/06* (2013.01); *B60K 11/08* (2013.01);
(Continued)

(58) Field of Classification Search
CPC ......... E02F 9/0866; E02F 3/32; E02F 9/0883; E02F 9/0891; E02F 9/0833; B60K 11/04;
(Continued)

(56) References Cited

U.S. PATENT DOCUMENTS 4,862,981 A * 9/1989 Fujikawa ............... B60K 5/10
180/68.4
5,329,889 A * 7/1994 Caldwell ............... F01P 11/029
123/41.54
(Continued)

FOREIGN PATENT DOCUMENTS

JP    11-190046 A    7/1999
JP    2005-207276 A    8/2005
(Continued)

OTHER PUBLICATIONS

International Search Report (PCT/ISA/210) issued in PCT Application No. PCT/JP2016/057682 dated May 31, 2016 with English translation (Four (4) pages).
(Continued)

*Primary Examiner* — Paul N Dickson
*Assistant Examiner* — Timothy Wilhelm
(74) *Attorney, Agent, or Firm* — Crowell & Moring LLP (57) ABSTRACT

To make a reserve tank be hardly affected by the heat of an engine. An engine room (5) is totally covered by an exterior cover (9) including openings (44) at the upper surface, and includes in the inside thereof an engine (13), a radiator (24), a cooling fan (20) for sucking external air and cooling the radiator, and a reserve tank (30) for storing cooling water of the engine. The reserve tank (30) is disposed at a position above the engine (13) and facing the openings (44) and a position on the upstream side of the flow of the air with respect to the openings (44).

2 Claims, 6 Drawing Sheets (51) Int. Cl.
*B60K 11/06* (2006.01)
*B60K 15/067* (2006.01)
*B60K 11/08* (2006.01)
*B60K 11/04* (2006.01)
*E02F 3/32* (2006.01)
*B60K 15/03* (2006.01)

(52) U.S. Cl.
CPC .......... *B60K 15/063* (2013.01); *B60K 15/067* (2013.01); *E02F 3/32* (2013.01); *E02F 9/0833* (2013.01); *E02F 9/0883* (2013.01); *E02F 9/0891* (2013.01); *B60K 2015/03414* (2013.01); *B60K 2015/03421* (2013.01); *B60Y 2200/412* (2013.01)

(58) Field of Classification Search
CPC .......... B60K 2015/03421; B60K 11/06; B60K 11/08; B60K 15/063; B60K 15/067; B60K 2015/03414; B60Y 2200/412
See application file for complete search history.

(56) References Cited

U.S. PATENT DOCUMENTS

| | | | | |
|---|---|---|---|---|
| 6,922,925 | B2* | 8/2005 | Watanabe | E02F 3/325 123/41.49 |
| 7,040,260 | B2* | 5/2006 | Yoshimatsu | F01P 5/06 123/41.49 |
| 8,261,861 | B2* | 9/2012 | Takei | B60K 11/04 180/291 |
| 8,973,353 | B2* | 3/2015 | Sawada | F01N 3/10 60/295 |
| 8,973,692 | B1* | 3/2015 | Okuda | E02F 9/0883 180/68.5 |
| 9,016,415 | B2* | 4/2015 | Kobayashi | B60K 11/02 180/68.4 |
| 9,238,901 | B2* | 1/2016 | Kamimae | B60K 13/04 |
| 9,266,422 | B2* | 2/2016 | Narita | B60K 5/1208 |
| 10,132,058 | B2* | 11/2018 | Kanehama | F15B 11/08 |
| 10,161,101 | B2* | 12/2018 | Nishiguchi | B60K 11/04 |
| 10,267,219 | B2* | 4/2019 | Murai | F01P 3/18 |
| 10,323,557 | B2* | 6/2019 | Kubota | E02F 3/325 |
| 2005/0210718 | A1 | 9/2005 | Ueda et al. | |
| 2006/0054113 | A1* | 3/2006 | Yasuda | F01P 11/12 123/41.65 |
| 2007/0044938 | A1* | 3/2007 | Farley | B60K 11/02 165/41 |
| 2013/0071212 | A1* | 3/2013 | Yunoue | B60K 11/08 414/685 |
| 2014/0290222 | A1* | 10/2014 | Sawada | F01N 3/10 60/286 |
| 2014/0301839 | A1* | 10/2014 | Funabashi | B60K 11/04 415/208.2 |
| 2015/0078967 | A1* | 3/2015 | Nakagami | F01N 3/10 422/173 |
| 2016/0265405 | A1* | 9/2016 | Nakano | F01N 3/2066 |

FOREIGN PATENT DOCUMENTS

| | | |
|---|---|---|
| JP | 2005-282110 A | 10/2005 |
| JP | 2007-16752 A | 1/2007 |
| JP | 2007-231636 A | 9/2007 |
| JP | 2014-114763 A | 6/2014 |
| JP | 5546694 B2 | 7/2014 |

OTHER PUBLICATIONS

Japanese-language Written Opinion (PCT/ISA/237) issued in PCT Application No. PCT/JP2016/057682 dated May 31, 2016 (Four (4) pages).

* cited by examiner

FIG. 6

CONSTRUCTION MACHINE

TECHNICAL FIELD

The present invention relates to a construction machine in which a reserve tank for supplying water to a radiator is included and the turning radius of the rear portion of a revolving upperstructure is made small.

BACKGROUND ART

As an example of the construction machine including a reserve tank for supplying water to a radiator, PATENT LITERATURE 1 is publicly known. In PATENT LITERATURE 1, such configuration is described that "an engine, a cooling fan connected to the engine, and a radiator disposed forward of the cooling fan are stored inside a revolving upperstructure, and a reservoir tank of the radiator is disposed right above a shroud of the cooling fan" (refer to the abstract).

CITATION LIST

Patent Literature

PATENT LITERATURE 1: JP-A No. H11-190046

SUMMARY OF INVENTION

Technical Problem

According to PATENT LITERATURE 1, there are such problems that there is almost no movement of the air around the reservoir tank and the reservoir tank is liable to be seriously affected by the heat due to heat generation of the engine because the reservoir tank is disposed at the upper portion of the shroud of the cooling fan, and, when the engine is stopped, the reservoir tank is liable to be thermally affected by heat generation of the engine because there is no flow of the air.

The present invention has been achieved in view of the circumstance described above, and its object is to provide a construction machine having such structure that a reserve tank is hardly affected by the heat of an engine.

Solution to Problem

In order to achieve the object described above, according to the present invention, there is provided a construction machine including a travel base and a revolving upperstructure that is turnably attached to the travel base and includes a working device in the front, a counterweight in the rear, and an engine room between the working device and the counterweight, in which the engine room is totally covered by an exterior cover that includes an opening at the upper surface, and includes an engine, a radiator, a cooling fan, and a reserve tank in the inside of the engine room, the cooling fan sucking external air and cooling the radiator, the reserve tank storing cooling water of the engine, a flow of air inside the engine room is formed so that external air sucked into the engine room by the cooling fan is discharged from the opening, and the reserve tank is disposed at a position above the engine and facing the opening and a position on the upstream side of the flow of the air with respect to the opening.

Advantageous Effects of Invention

According to the present invention, the reserve tank is hardly affected by the heat of the engine. Also, problems, configurations, and effects other than the above will be clarified by explanation of embodiments below.

DESCRIPTION OF EMBODIMENTS

Figure 1:
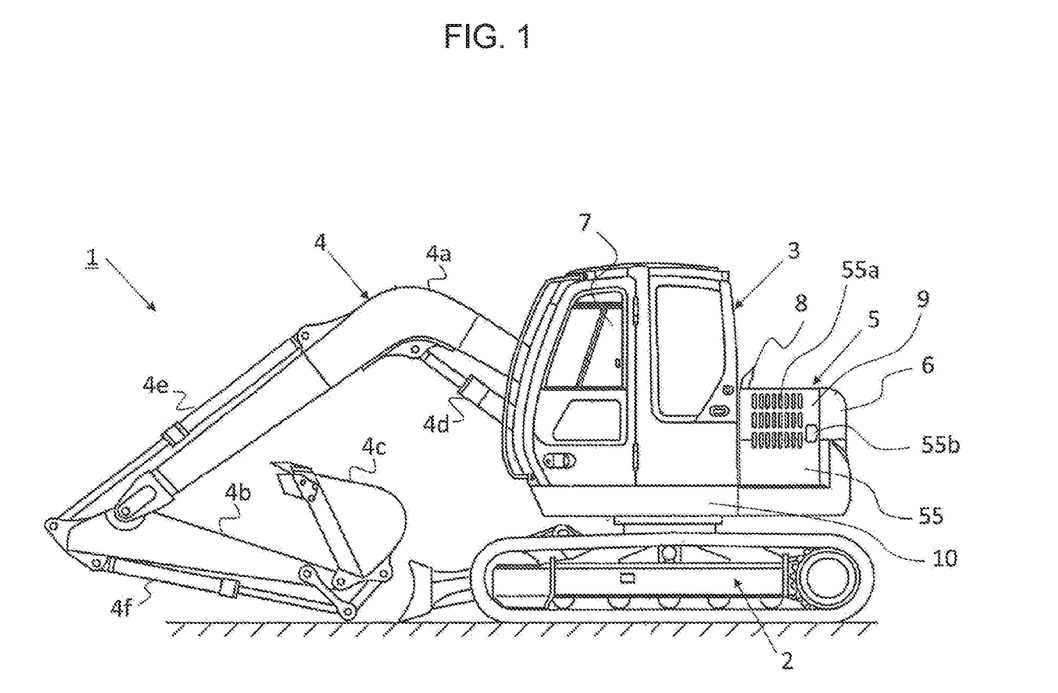
FIG. 1 is a side view of a minimal swing radius hydraulic excavator according to an embodiment of the present invention.
Figure 2:
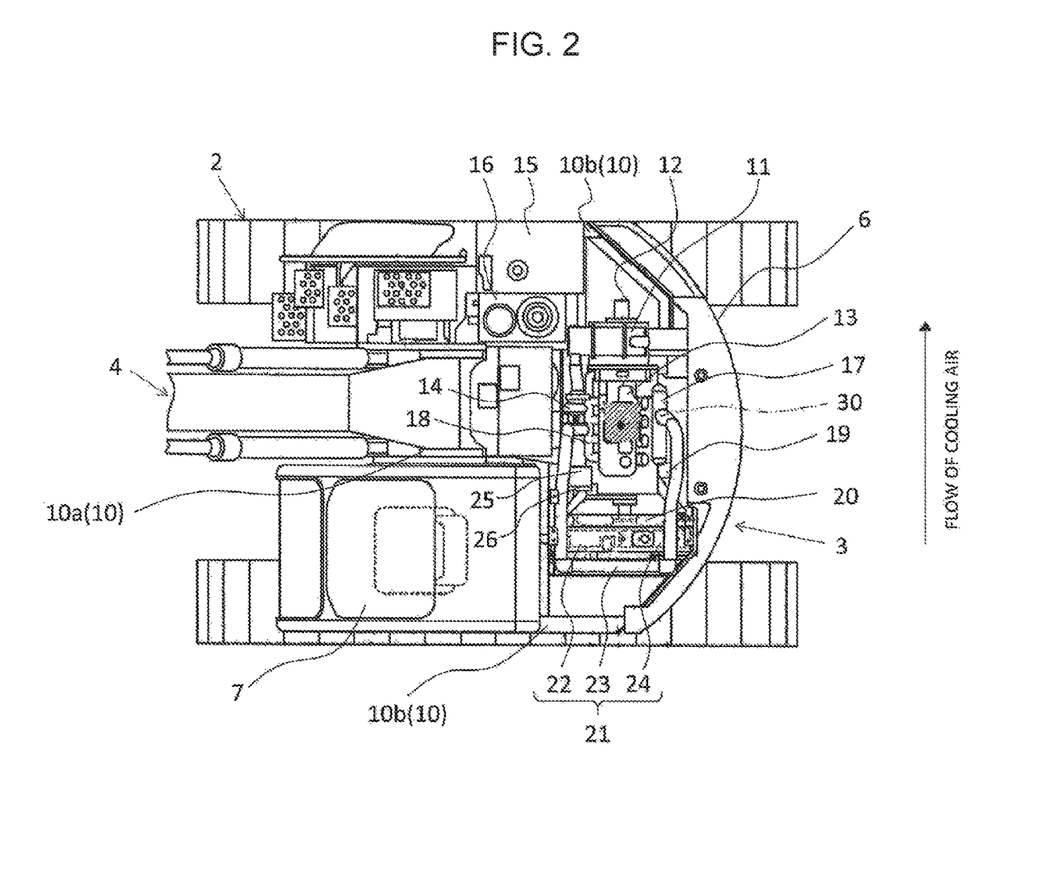
FIG. 2 is a plan view that shows the inside of an engine room of the minimal swing radius hydraulic excavator shown in FIG. 1.

Embodiments of a construction machine according to the present invention will be explained using the drawings. FIG. 1 is a side view of a minimal swing radius hydraulic excavator that is a representative example of a construction machine according to the present invention, and FIG. 2 is a plan view that shows the inside of an engine room of the minimal swing radius hydraulic excavator shown in FIG. 1. Also, in the explanation below, words of front, rear, left, and right are used based on the eye line of a worker riding and operating the minimal swing radius hydraulic excavator unless otherwise stated.

As shown in FIG. 1, a minimal swing radius hydraulic excavator (will be hereinafter referred to as a hydraulic excavator) 1 includes a travel base 2 and a revolving upperstructure 3 that is turnably attached to the upper side of the travel base 2. Here, the minimal swing radius type means a type in which the turning diameter of the revolving upperstructure falls generally within the vehicle width of the travel base. For example, when the turning diameter of the revolving upperstructure of a hydraulic excavator falls within approximately 120% of the vehicle width, the hydraulic excavator is categorized as the minimal swing radius type.

The revolving upperstructure 3 includes a revolving frame 10 that becomes a base, a cab 7 that is disposed on the front left side of the revolving frame 10, a front working mechanism (working device) 4 that is attached to the center in the front of the revolving frame 10 so as to be vertically rotatable, a counterweight 6 that is disposed behind the revolving frame 10, and an engine room 5 that is disposed between the front working mechanism 4 and the counterweight 6.

As shown in FIG. 2, the revolving frame 10 is configured of a rigid body that includes a center frame 10a of the center and side frames 10b in the left and right of the center frame 10a, and the front working mechanism 4 is attached to the distal end of the center frame 10a.

As shown in FIG. 1, the front working mechanism 4 is configured so as to include a boom 4a, an arm 4b, a bucket 4c, and hydraulic cylinders (actuators) 4d to 4f. The counterweight 6 is for achieving a weight balance with the front working mechanism 4, and is formed as a heavy object having an arc shape. Also, the counterweight 6 according to the present embodiment is disposed at a position close to the turning center so that the rear side of the revolving upperstructure 3 falls generally within the vehicle width of the travel base 2 even in the turning motion. Therefore, the space inside the engine room 5 becomes narrow compared with an ordinary hydraulic excavator.

The engine room 5 is totally covered by an exterior cover 9. On the left side of the exterior cover 9, a door 55 is arranged through a hinge not illustrated, the door 55 opening/closing in a lateral direction. A suction port 55a and a knob 55b are arranged in the door 55, the suction port 55a sucking the external air (cooling air) into the engine room 5.

The suction port 55a is arranged at the upper portion of the door 55, and has a shape of plural slits set elongated so that large foreign particles do not enter into the engine room 5 accompanying the external air. Also, it is configured to open the door 55 by pulling the knob 55b to execute a maintenance work and the like of the inside of the engine room 5.

Although it is not illustrated, on the right side of the exterior cover 9 of the engine room 5, an outlet is formed which is for discharging the external air to the outside, the external air having been sucked from the suction port 55a into the engine room 5. Further, although it will be described below in detail, at the upper surface of the exterior cover 9, an engine cover 41 and a maintenance cover 50 are arranged (refer to FIG. 3). Also, the reference sign 8 is a tail pipe for discharging an exhaust gas to the outside, the exhaust gas having been discharged from an engine 13 (refer to FIG. 2).

Next, the internal configuration of the engine room 5 will be explained. As shown in FIG. 2, the engine room 5 is configured to mainly include the engine 13, a heat exchanger unit 21 that exchanges heat with the engine 13, an exhaust gas post-treatment device 11 for reducing hazardous nitrogen oxide included in the exhaust gas from the engine 13 and degrading the nitrogen oxide to non-hazardous water and nitrogen, a hydraulic pump 12 that is driven by the engine 13 and supplies a hydraulic oil to the hydraulic cylinders 4d to 4f and the like of the front working mechanism 4, a compressor 19 for air conditioning of the inside of the cab 7, an alternator 25, a level gauge 26, a reserve tank 30, a hydraulic oil tank 16 that stores a hydraulic oil supplied to the hydraulic pump 12, and a fuel tank 15 that stores fuel of the engine 13.

The engine 13 is mounted in a transverse state so as to extend in the lateral direction. Also, the engine 13 includes an intake manifold 17 that divides the air having been taken in to respective cylinders (not illustrated) and an exhaust manifold 18 that collects and discharges the exhaust gas from respective cylinders, and a turbocharger 14 is arranged on the flow out side of the exhaust manifold 18, the turbocharger 14 increasing the flow rate of the intake gas.

Also, to the left end of the engine 13, a cooling fan 20 is attached. The cooling fan 20 sucks the external air into the exterior cover 9 through the suction port 55a because the cooling fan 20 is rotatavely driven using the engine 13 as a power source. The cooling air having been sucked into the exterior cover 9 cools various devices installed within the engine room 5, and is thereafter discharged to the atmospheric air from the outlet (not illustrated), openings 44 (refer to FIG. 3), and the like. In other words, in the present embodiment, the cooling air flows from the left to the right of the revolving upperstructure 3 (from the bottom to the top of FIG. 2). Also, the heat exchanger unit 21 is disposed so as to face the flow of the cooling air.

The heat exchanger unit 21 is configured so as to include a radiator 24 that cools cooling water for the engine 13, an oil cooler 22 that cools a hydraulic oil for operating the front working mechanism 4, and an intercooler 23 that cools the intake of the engine 13, and is disposed on the upstream side of the flow of the cooling air with respect to the cooling fan 20, namely on the left side of the cooling fan 20. Considering the maintainability, the heat exchanger unit 21 is made detachable in a state the radiator 24 is integrated with the oil cooler 22 and the intercooler 23.

Thus, in the inside of the engine room 5, each of the heat exchanger unit 21, the cooling fan 20, the engine 13, and the hydraulic pump 12 are disposed in this order from the upstream side to the downstream side of the flow of the cooling air, and the reserve tank 30 is arranged above the substantial center of the engine 13 as shown by the hatched line in FIG. 2, the reserve tank 30 being for storing the cooling water of the engine 13.

Figure 3:
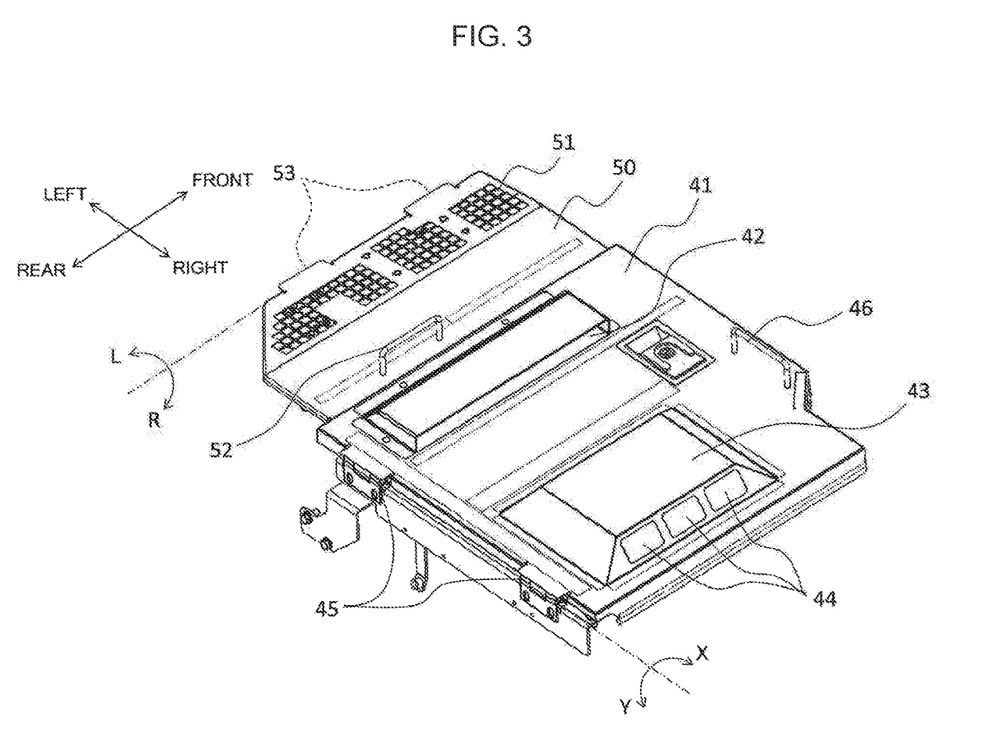
FIG. 3 is an external perspective view of an engine cover and a maintenance cover of the engine room.

Next, the details of the engine cover 41 and the maintenance cover 50 will be explained, the engine cover 41 and the maintenance cover 50 being attached to the upper portion of the exterior cover 9. FIG. 3 is an external perspective view of the engine cover 41 and the maintenance cover 50. As shown in FIG. 3, the engine cover 41 and the maintenance cover 50 are disposed so as to be arrayed in the lateral direction.

The maintenance cover 50 is a plate in which a number of ventilation holes 51 are arranged on the left side and a knob 52 is arranged on the right side, and the maintenance cover 50 is attached to the upper portion of the exterior cover 9 through a hinge 53. A worker holds the knob 52 to open/close the maintenance cover 50 in the L-direction and R-direction of FIG. 3. Also, when the maintenance cover 50 is opened, it becomes possible to draw out the heat exchanger unit 21.

The engine cover 41 is a plate in which a discharge port 42 is arranged on the left side and a protrusion portion 43 is arranged on the right side respectively and a knob 46 is arranged on the front side, and the engine cover 41 is attached to the upper portion of the exterior cover 9 through a hinge 45. A worker holds the knob 56 to open/close the engine cover 41 in the X-direction and Y-direction of FIG. 3.

The protrusion portion 43 is formed into a generally truncated quadrangular pyramid, and the three openings 44 are arranged at the side surface that is an inclined surface on the right side. Although it will be described in detail below, the openings 44 are for emitting the cooling air having been taken in to the inside of the engine room 5 to the atmospheric air. Also, the reserve tank 30 is disposed below the protrusion portion 43. In other words, the protrusion portion 43 protrudes in order to cover the top portion of the reserve tank 30.

Also, when the engine cover 41 is opened, a maintenance space A (refer to FIGS. 4 to 6) described below is exposed, various devices within the engine room 5 become accessible, and visual confirmation of the level gauge 26 and the like also can be executed.

Figure 4:
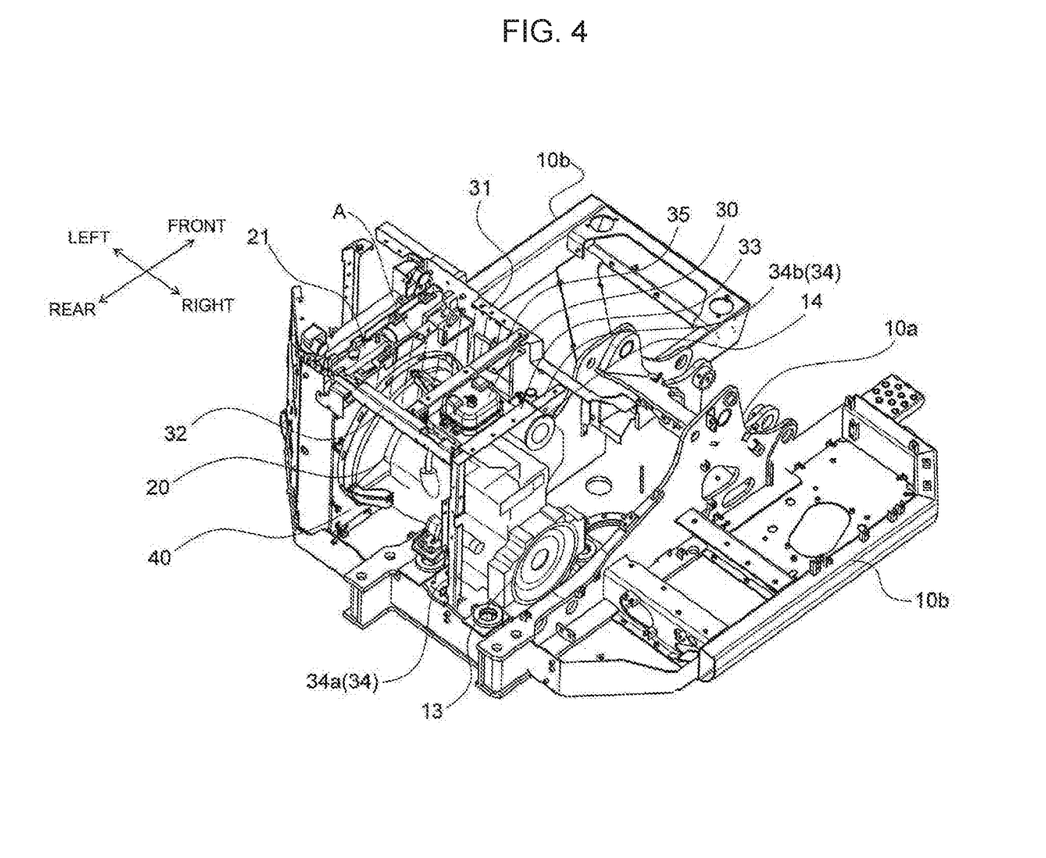
FIG. 4 is a configuration drawing when an essential portion including an engine inside the engine room is viewed from obliquely above in the right.

Next, the positional relation of the engine and the reserve tank will be explained using FIG. 4 to FIG. 6. FIG. 4 is a configuration drawing when an essential portion including the engine 13 inside the engine room 5 is viewed from obliquely above in the right, FIG. 5 is a configuration drawing when an essential portion including the engine 13 inside the engine room 5 is viewed from the rear, and FIG.

6 is a configuration drawing when an essential portion including the engine 13 inside the engine room 5 is viewed from the top.

Figure 5:
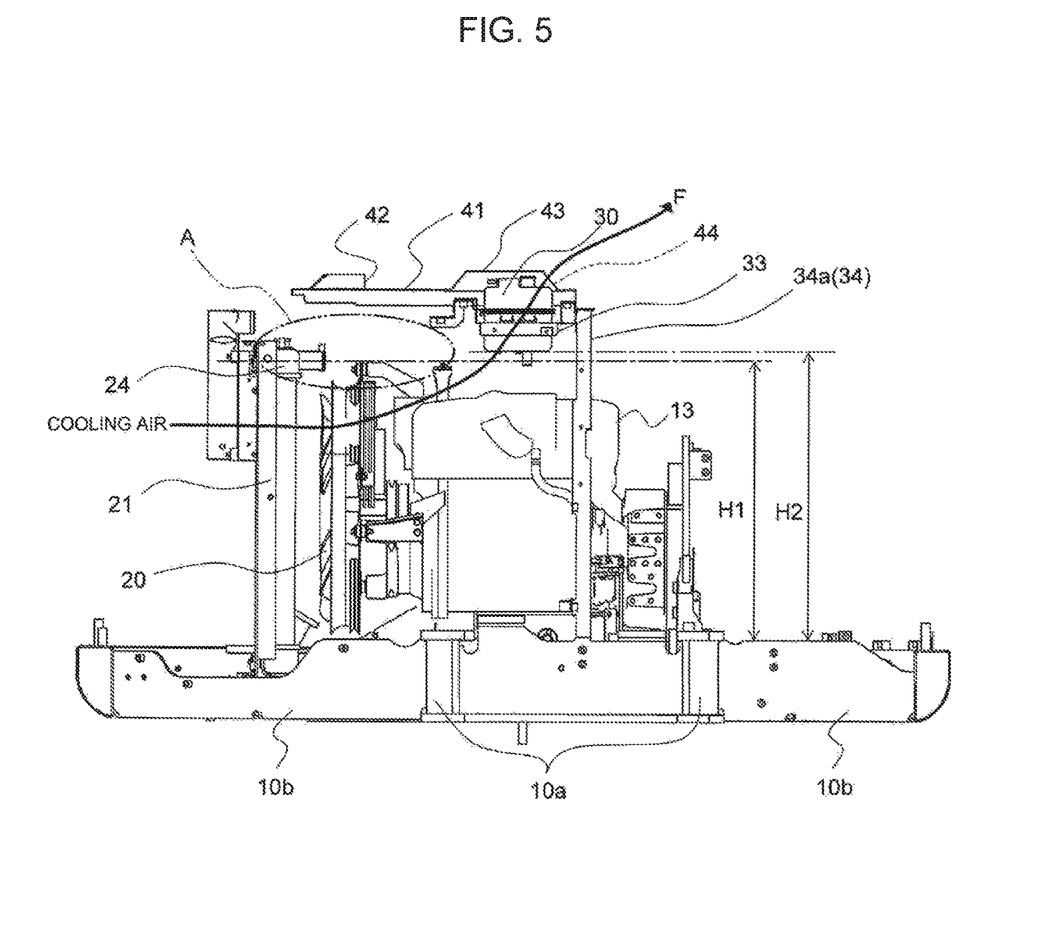
FIG. 5 is a configuration drawing when an essential portion including the engine inside the engine room is viewed from the rear.
Figure 6:
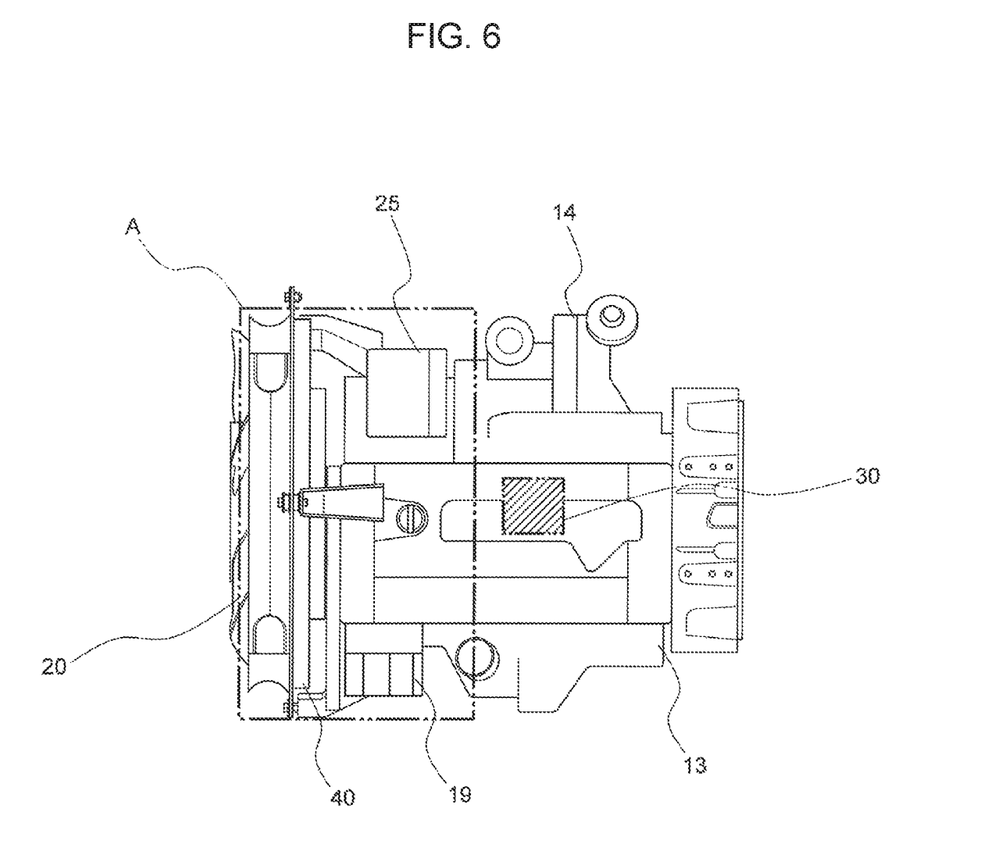
FIG. 6 is a configuration drawing when an essential portion including the engine inside the engine room is viewed from the top.

As shown in FIG. 4 to FIG. 6, plural frames are arranged around the engine 13. In concrete terms, a front side grilled compartment frame 31, a rear side grilled compartment frame 32, and an engine upper right side grilled compartment frame 34, and an engine upper left side grilled compartment frame 35 are arranged around the engine 13. The engine upper right side grilled compartment frame 34 is formed into a generally reverse L-shape by an engine upper right side grilled compartment first frame 34a and an engine upper right side grilled compartment second frame 34b, the engine upper right side grilled compartment first frame 34a extending upward from a side frame 10b, the engine upper right side grilled compartment second frame 34b extending horizontally forward from the upper end of the engine upper right side grilled compartment first frame 34a.

The rear side grilled compartment frame 32 works as a bridge between the upper portion of a fan shroud 40 and the upper ends of the engine upper right side grilled compartment first frame 34a, the fan shroud 40 storing the cooling fan 20, and the rear side grilled compartment frame 32 is arranged on the rear side of the front side grilled compartment frame 31 at a same height and to be generally parallel. The engine upper left side grilled compartment frame 35 is arranged on the left side of the engine upper right side grilled compartment second frame 34b at a same height and to be generally parallel. Also, a bracket 33 is arranged so as to work as a bridge between the engine upper left side grilled compartment frame 35 and the engine upper right side grilled compartment second frame 34b. The reserve tank 30 is attached to this bracket 33.

The reserve tank 30 is positioned generally in the center in the lateral direction and above of the engine 13. To be more specific, the reserve tank 30 is disposed at a height position H2 that is higher than a height position H1 of the radiator 24 of the heat exchanger unit 21 from the side frame 10b. Also, it is configured that the protrusion portion 43 of the engine cover 41 covers the upper portion of this reserve tank 30. When the upper portion of the reserve tank 30 is covered by the protrusion portion 43, the openings 44 of the protrusion portion 43 come to be positioned in the vicinity of the reserve tank 30 and on the downstream side of the flow of the cooling air. In other words, the reserve tank 30 is disposed at a position that is located generally right above the engine 13, faces the openings 44 of the protrusion portion 43, and is positioned on the upstream side of the flow of the cooling air with respect to the openings 44.

As shown in FIG. 4 to FIG. 6, the maintenance space A is formed at the left upper portion of the engine 13. This maintenance space A is a space required, for example, for a worker to visually confirm the liquid surface of the level gauge 26 (refer to FIG. 2), to blow air to the cooling fan 20 to clean the dust and the like attached to the cooling fan 20, and to inspect the tension of a belt not illustrated. Therefore, in the present embodiment, the reserve tank 30 is disposed at a position escaping this maintenance space A. Accordingly, in the present embodiment, there is no event that the reserve tank 30 becomes an encumbrance to the maintenance work.

Next, the flow of the cooling air within the engine room 5 will be explained using FIG. 5. As shown in FIG. 5, the cooling air is sucked from the left side and is discharged to the right side by the cooling fan 20. At this time, the cooling air flows also to the direction of an arrow F of FIG. 5 because of the openings 44 arranged in the protrusion portion 43 of the engine cover 41. Since the reserve tank 30 is positioned on the route of the flow of the cooling air, the reserve tank 30 is directly cooled constantly by the cooling air. Therefore, the inside of the reserve tank 30 is prevented from becoming hot in the inside of the engine room 5.

As explained above, according to the present embodiment, because it is configured that the cooling air directly hits the reserve tank 30, the reserve tank 30 is hardly affected by the heat of the engine 13, and the temperature rise of the cooling water inside the reserve tank 30 is suppressed. Also, because the reserve tank 30 is disposed at a position above the engine 13 and escaping the maintenance space A, the reserve tank 30 does not become an encumbrance to the maintenance work when the maintenance work of the inside of the engine room 5 is executed.

Also, because the reserve tank 30 is disposed at a position higher than the radiator 24, water supply from the reserve tank 30 to the radiator 24 becomes excellent. Further, because the protrusion portion 43 is formed into a generally truncated quadrangular pyramid shape of a degree capable of covering the upper portion of the reserve tank 30, such effect also can be exerted that the protrusion portion 43 hardly hinders rearward visibility of a worker riding the cab 7.

Also, the embodiments described above are only exemplifications for explanation of the present invention, and are not intended to limit the scope of the present invention only to these embodiments. A person with an ordinary skill in the art can implement the present invention with other various aspects without departing from the gist of the present invention.

REFERENCE SIGNS LIST

1 . . . Minimal swing radius type hydraulic excavator (construction machine)
2 . . . Travel base
3 . . . Revolving upperstructure
4 . . . Front working mechanism (working device)
5 . . . Engine room
6 . . . Counterweight
9 . . . Exterior cover
13 . . . Engine
24 . . . Radiator
30 . . . Reserve tank
41 . . . Engine cover (cover)
43 . . . Protrusion portion
44 . . . Opening
A . . . Maintenance space

The invention claimed is:
1. A construction machine, comprising:
a travel base; and
a revolving upperstructure that is turnably attached to the travel base and includes a working device in the front, a counterweight in the rear, and an engine room between the working device and the counterweight,
wherein the engine room is totally covered by an exterior cover that includes an opening at an upper surface, and includes an engine, a radiator, a cooling fan, and a reserve tank in the inside of the engine room, the cooling fan sucking external air and cooling the radiator, the reserve tank storing cooling water of the engine,
a flow of air inside the engine room is formed so that external air sucked into the engine room by the cooling fan is discharged from the opening, a protrusion portion which protrudes upward for covering an upper surface of the reserve tank is formed on the upper surface of the exterior cover, the opening is disposed at a side surface of the protrusion portion, and the reserve tank is disposed at a position which is at a center of and above the engine and facing the opening and a position on the upstream side of the flow of the air with respect to the opening.

2. The construction machine according to claim 1, wherein the radiator, the cooling fan, and the engine are disposed in this order from the upstream side to the downstream side of the flow of the air, a space for maintenance is formed between the cooling fan and the engine, and the reserve tank is disposed at a position escaping the space for maintenance and a position above the radiator.

\* \* \* \* \*